United States Patent [19]

Furuhama

[11] Patent Number: 5,054,297
[45] Date of Patent: Oct. 8, 1991

[54] COLD STORAGE SYSTEM

[75] Inventor: Kokichi Furuhama, Tokyo, Japan

[73] Assignee: Kabushiki Kaisha Toshiba, Kawasaki, Japan

[21] Appl. No.: 585,903

[22] Filed: Sep. 21, 1990

[30] Foreign Application Priority Data

Sep. 22, 1989 [JP] Japan .................... 1-244962

[51] Int. Cl.$^5$ .............................. F25D 23/12
[52] U.S. Cl. ........................ 62/260; 165/45
[58] Field of Search ............ 62/260, 235, 119; 165/45

[56] References Cited

U.S. PATENT DOCUMENTS

| | | | |
|---|---|---|---|
| 3,195,619 | 7/1965 | Tippmann | 62/260 X |
| 4,240,268 | 12/1980 | Yaan | 62/260 |
| 4,346,569 | 8/1982 | Yaan | 62/260 |
| 4,418,549 | 12/1983 | Courneya | 62/260 |

FOREIGN PATENT DOCUMENTS 60-60457 4/1985 Japan .

OTHER PUBLICATIONS

23rd National Heat Transfer Symposium of Japan P539 Tanaka, S. et al.; May 1986.
24th National Heat Transfer Symposium of Japan P492 Udaka, Y. et al., May 1987.

*Primary Examiner*—Lloyd L. King
*Attorney, Agent, or Firm*—Oblon, Spivak, McClelland, Maier & Neustadt

[57] ABSTRACT

A cold storage system installed in a reservoir on the ground whose atmospheric temperature becomes 0° C. or less in winter season comprises at least one heat exchanger having one end located in the water stored in the reservoir and the other end located in the atmosphere and for performing one-direction heat transfer in such a manner as to absorb heat from the water of the reservoir and emit it into the atmosphere, and a hold member for holding the heat exchanger in the reservoir.

17 Claims, 2 Drawing Sheets

COLD STORAGE SYSTEM

BACKGROUND OF THE INVENTION

1. Field of the Invention

The present invention relates to a cold storage system utilizing natural ice.

2. Description of the Related Art

In Japan, there are many lakes, lagoons and ponds, most of which have an atmospheric temperature sufficiently higher than 0° C. in spring season, so that the ice formed in winter season begins to melt and then entirely melts into water before summer season.

Accordingly, an effective method of utilizing the ice of lake, lagoon and pond has not been found except for utilization as skating rink in some places.

Now, energy resource preservation and environmental protection are a big social issue, and thus an extension of natural energy utilization is an important theme toward the twenty-first century. Ice, being a low temperature and a large heat accumulating density, is suitable for cold storage medium, and its utilization has been researched and developed as a medium for small-sized cold storage system. The ice of lake, lagoon and pond is formed by natural energy, and, because they have a large surface area, a large amount of ice is obtained in winter season. Thus, if at least part of the ice is stored until summer season, and can be used as a cold heat source for cooling and the like, a large energy-saving effect will be expected.

When atmospheric temperature becomes lower than water surface temperature, heat transfers from the water by radiation and convection to the atmosphere. When in winter season atmospheric temperature becomes lower to some extent than 0° C., water surface temperature also becomes 0° C. or less, and water begins to freeze.

When a thin ice is then formed on the water surface, the residual water locating under the ice performs heat exchange through the ice with the atmosphere. In this case, a heat resistance due to ice exists between the residual water and atmosphere, so that the temperature of the residual water becomes higher than that of the surface. However, when atmospheric temperature is fairly less than 0° C., the temperature of the residual water near the ice becomes 0° C. or less and the water ices. Thus, the ice becomes gradually thick, and accordingly the heat resistance between the ice and residual water becomes large and finally the temperature of the residual water does not become 0° C. or less, causing ice formation to stop. Therefore, for lakes, lagoons and ponds in Japan, the ice formed in winter season is often limited to the vicinity of the surface.

On the other hand, when spring season comes, the surface is heated by the sun light or the atmosphere with a raised temperature, and the ice begins to melt gradually from the surface. Since the ice formed in winter season is limited to the vicinity of the surface, it melts in a relatively short period. The ice of lakes, lagoons and ponds disappears completely in summer season when the ice is required as a cold heat source, making the utilization of the ice as a cold heat source very difficult.

Thus, in the conventional lakes, lagoons and ponds, the ice of only the vicinity of the surface is formed, so that the ice cannot be stored until summer season and has not been utilized as a cold heat source by natural energy.

SUMMARY OF THE INVENTION

The object of the present invention is to provide a cold storage system in which the icing quantity in a reservoir or water storage tank in winter season is allowed to increase, and at least part of the ice is stored until summer season so as to be utilized as a cold heat source.

The object of the present invention is achieved by a cold storage system described below. That is, the cold storage system is installed in water storage means on the ground whose atmospheric temperature becomes 0° C. or less in winter season, and includes at least one heat exchange means having one end located in the water stored in the water storage means and the other end located in the atmosphere and for performing one-direction heat transfer in such a manner as to absorb heat from the water of the water storage means and emit it into the atmosphere, and hold means for holding the heat exchange means in the water storage means.

Accordingly, in the present invention, by the function of the heat exchange means, the heat resistance between the atmosphere and the residual water under the ice in winter season becomes small, so that even if the ice becomes thick the temperature of the residual water becomes 0° C. or less which in turn allows all or most of the water in a reservoir or water storage tank to be freezed, with the result that at least part of ice can be stored in the reservoir or water storage tank until summer season so as to be utilized as a cold heat source.

DETAILED DESCRIPTION OF THE PREFERRED EMBODIMENTS

With reference to drawings, the embodiments of the present invention will be explained hereinafter.

Figure 1:
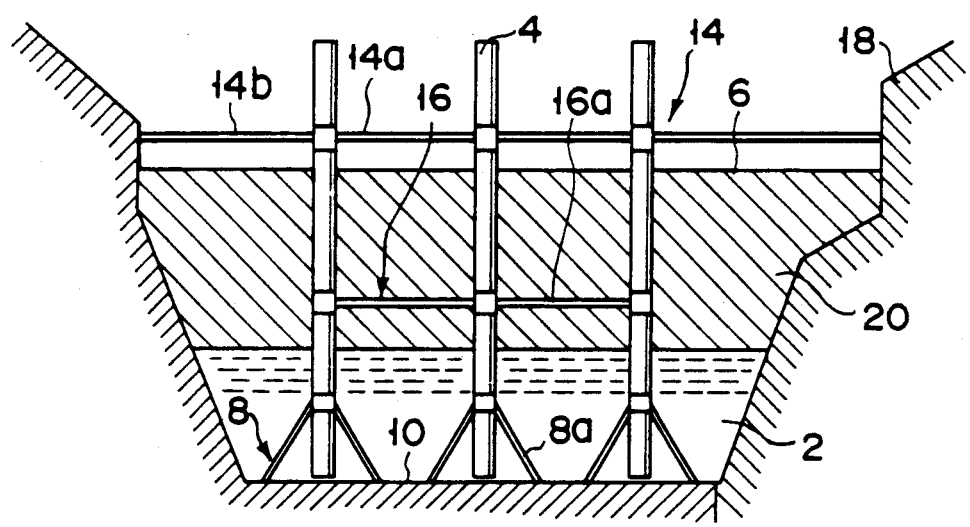
FIG. 1 is a side view of a cold storage system according to a first embodiment of the present invention.

In FIG. 1, a first embodiment of a cold storage system according to the present invention is shown. The first embodiment relates to a cold storage system installed in a lake in a cold district where outer air temperature becomes −5° to −20° C. in winter season.

The cold storage system includes a plurality (three in this embodiment) of heat pipes 4, which are located in the lake so as to be substantially vertical to a water surface 6 of the lake, and whose lower end is held by a bottom support unit 8 having legs 8a located on a lake bottom 10 and whose upper end is located in an atmosphere 12. The adjacent heat pipes 4 are combined with each other by an upper support unit 14 and a middle support unit 16. The middle support unit 16 has fixing members 16a for fixing the heat pipes to each other. The upper support unit 14 has fixing members 14a and support members 14b which are fixed to a lake bank 18. Accordingly, each of heat pipes 4 can not move in the water and thus can keep constant the relative position to a lake water 2.

Figure 2:
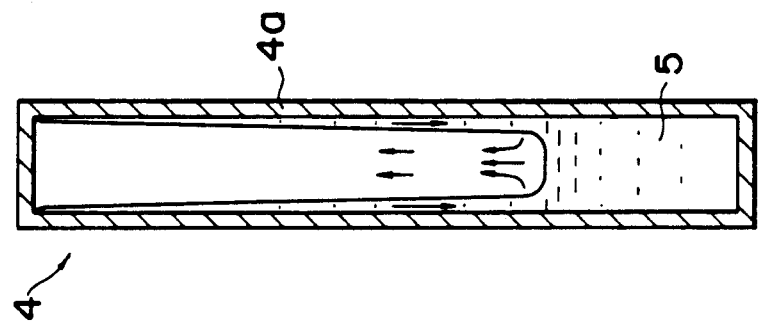
FIG. 2 is a longitudinal sectional view of a heat pipe according to the first embodiment.

As shown in FIG. 2, a heat exchange medium 5 such as ammonia is pressurized to a specified pressure and charged in each of the heat pipes 4. In winter season, the temperature of the lake water 2 is higher than that of the atmosphere 12, so that, as shown in FIG. 2, the medium 5 in the heat pipe 4 exchanges heat at its part submerged in the lake water 2 with the lake water to evaporate and rise in the heat pipe 4. On the other hand, the evaporated medium 5 exchanges heat at the upper part located in the atmosphere 12 with the atmosphere to condense and emit the heat absorbed from the lake water into the atmosphere 12. Then, the condensed and liquidized medium 5 moves down to the lower part of the heat pipe 4 mainly by gravity action.

Thus, the heat transfer mechanism of the heat pipe 4 functions in winter season so that heat is transferred with a high efficiency from the lake water 2 to the atmosphere 12. Also, by the function of the heat pipe 4, the heat resistance between the lake water 2 and the atmosphere 12 is considerably reduced, so that, even when an ice 20 formed on the lake surface is thick, the temperature of the lake water 2 under the ice 20 can be decreased to 0° C. or less. Accordingly, the quantity of ice formed in winter season considerably increases, and in some case almost all the lake water can be frozen.

On the other hand, in spring or summer season, the temperature of the atmosphere 12 becomes higher than that of the ice 20 or the non-frozen lake water 2, so that the heat exchange medium 5 evaporates in the part of the heat pipe 4 located in the atmosphere and condenses in the part located in the ice 20 or the lake water 2, with the result that, if there is no force to move the condensed medium in the heat pipe 4 in the direction opposite to gravity, heat energy can not be transferred. Thus, the function of the heat transfer of the heat pipe 4 stops, causing the rate of the heat exchange between the ice 20 formed in the lake and the atmosphere 12 to be reduced.

As described above, when the heat pipe 4 is used as one-direction heat exchange means, in spring or summer seasons, the heat resistance between the atmosphere 12 and the ice 20 or the lake water 2 becomes substantially the same as the case where the heat pipe 4 is not provided, and the melting rate of the ice 20 becomes substantially the same as for conventional lakes. Accordingly, at least part of the ice 20 formed in large quantities in winter season can be stored until summer seasons so as to be utilized as a cold heat source.

Although the cold storage system shown in the embodiment employs three heat pipes, the number of pipes may further be increased depending on the area of a lake. Where the length of each heat pipe becomes longer because of deeper lake depth, the middle support unit 16 may be made plural in number of fixing members 16a, or it may be fixed to the lake bank 18 to increase its structural strength. Further, the heat pipe 4 may be arranged such that the length of the heat pipe 4 is made short and the bottom support unit 8 is omitted so that the bottom portion of the heat pipe 4 is located in the water not on the lake bottom.

Also, a wick to flow the heat exchange medium 5 downward may be provided on the inside of the heat pipe 4.

Figure 3:
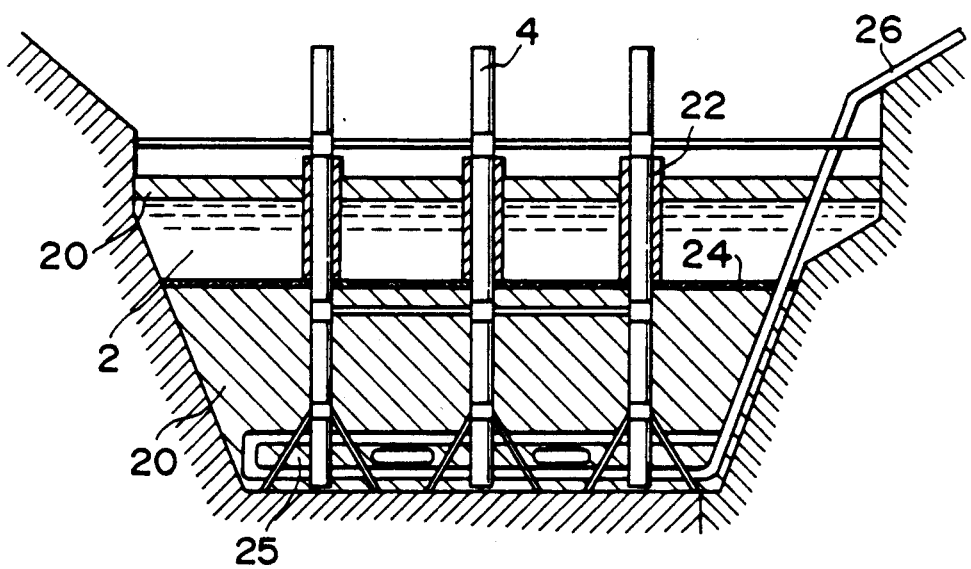
FIG. 3 is a side view of a cold storage system according to a second embodiment of the present invention.

FIG. 3 shows a second embodiment of the present invention. In the second embodiment, three heat pipes 4 are installed in the lake in the same manner as for the first embodiment, and in addition, a heat insulator 22 is mounted on each of the upper region excluding the top end portion of the heat pipes 4. That is, the part of each heat pipe 4 from the water surface to a specified depth is insulated by the insulator 22 from the lake water 2. Accordingly, the heat exchange of the heat pipe 4 in winter season is performed between the bottom part not covered with the insulator 22 and the atmosphere 12, so that the ice 20 is formed in the lake water surface part and in the bottom part. When an ice 20 is formed in the bottom part as described above, even if atmospheric temperature rises, heat resistance is increased by the lake water 2 existing on the lake bottom ice 20 to reduce heat transfer efficiency, thereby allowing the ice melting rate to be inhibited. In addition since all of the lake water is not frozen, the ecological system in the lake is not disrupted.

Also, instead of providing the insulator 22, the pipe is made to have two-layer construction at the part where the insulator 22 is provided in the above example and the space formed between two layers may include a member having a low heat transfer rate.

In the second embodiment, a trap member 24 formed of wire mesh and the like is located in such position in the water that is deeper than that of the part covered with the insulator, and the peripheral part of the trap member 24 is fixed to the lake bank 18. Accordingly, the ice 20 formed on the lake bottom in winter season begins to partly melt with an increase of water temperature, and some portions of the ice may begin to float in the water by its buoyancy, but they are held in the water by the trap member 24. Although the ice floating to the water surface exchanges heat with the atmosphere to increase the melting rate, such holding of the ice by the trap member allows the melting rate to be inhibited.

The trap member 24 may be made of any material. For example, instead of using wire mesh, nylon mesh may be employed. Alternatively, the bottom support unit 8 may serve as trap means if its periphery is surrounded with ice.

Further, in the second embodiment, a heat exchanger 25 for utilizing ice to take out cold air in summer season is disposed on the lake bottom. The heat exchanger 25 includes many pipe lines 26 for supplying air. Accordingly, when air is supplied into the pipe lines 26 of the heat exchanger 25, with the ice formed on the lake bottom held by the trap member 24, the air is cooled by the surrounding ice to allow cold air to be taken out.

Figure 4:
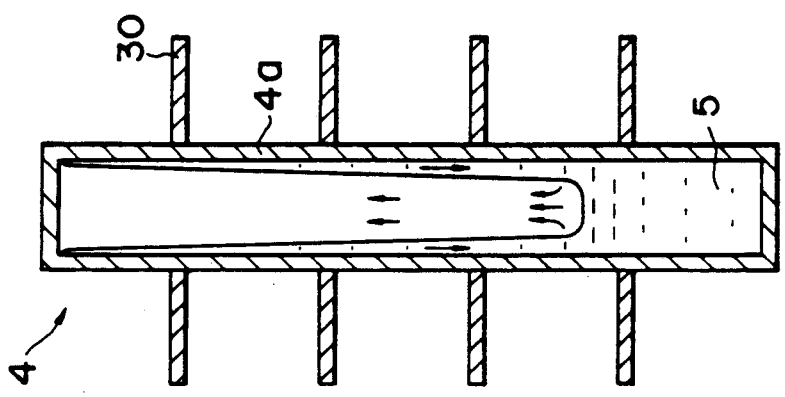
FIG. 4 is a longitudinal sectional view showing a first modification of the heat pipe.

FIG. 4 shows a first modification of the heat pipe used for the cold storage system of the present invention. In the first modification, a plurality of fins 30 are fixed by welding and the like to a side wall 4a of the heat pipe 4, and extended perpendicularly to the longitudinal axis of the heat pipe 4. Accordingly, for the heat pipe 4, the heat at the free ends of the fins 30 is transferred to the side wall on the heat pipe 4 to cause heat exchange efficiency to be improved.

In particular, when ice adheres to the cooling part of the heat pipe 4, the ice itself serves as a heat resistance and inhibits ice growth. However, the fins 30 provide the heat pipe 4 with an increased surface area, so that the contact area with the lake water will be increased, allowing ice growth to be promoted.

Figure 5:
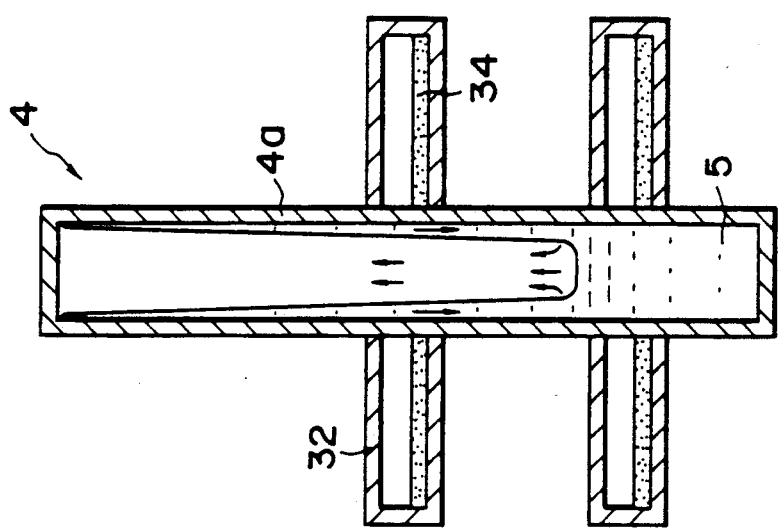
FIG. 5 is a longitudinal sectional view showing a second modification of the heat pipe.

FIG. 5 shows a second modification of the heat pipe. In the second modification, thin drum-like auxiliary heat pipes 32 are mounted on the side wall 4a at the lower part of the heat pipe 4. The heat exchange medium 5 is charged in each auxiliary heat pipe 32, in which a wick for flowing the medium 5 from the vicinity of the side wall 4a of the heat pipe 4 in the radial direction utilizing capillary phenomenon is provided. Accordingly, in the second modification, heat exchange is also performed in the auxiliary heat pipe 32 in radial direction, so that the cooling of the free end of the auxiliary heat pipe 32 is attained, and ice growth is promoted similarly to the first modification.

Although a temperature difference between the inside and the outside of the heat pipe 4 develops, the temperature difference is due to the heat resistance of the side wall 4a. Accordingly, it is preferable that the side wall 4a of the heat pipe 4 is formed with a material having a heat resistance as small as possible to increase heat exchange efficiency.

A heat exchange medium charged in the heat pipe of the cold accumulating arrangement of the present invention will be explained hereinafter.

Where an outer air temperature $T_0$ is less than 0° C. and a water temperature $T_w$ is 0° C. or more, the working temperature (saturation temperature $T_s$ of a medium charged in the heat pipe) must satisfy a requirement, $T_0 < T_s < T_2$. However, the heat pipe inherently has a function for adjusting the working temperature of a medium, so that the working temperature of the medium can satisfy the requirement as long as the quantity of the medium charged is not excessive nor short. Accordingly, the absolute requirement in selecting a medium is that the working temperature is fairly lower than the critical temperature of the medium (for example, methane with a critical temperature of 191 K is unsuitable) and sufficiently higher than the melting point of the medium (for example, water is unsuitable). Although numberless media satisfying the requirement exist, a practical requirement is that working pressure range (the saturation pressure according to a working temperature) be proper and the latent heat of a medium be large. However, the requirement cannot be quantified to be indicated.

Media usable for the cold storage system of the present invention will be listed in the following items (1) through (6) and their working pressure range be shown. These media satisfy the requirement that the working pressure range be from 1 MPa (approx. 10 atmospheric pressure) or less to 0.01 MPa (approx. 0.1 atmospheric pressure) or more, and the latent heat be 200 KJ/Kg or more (for example, that of ammonia having the maximum latent heat except water is approx. 1250 KJ/Kg).

(1) Ammonia : $0.5 \text{ MPa} \geq p \geq 0.2 \text{ MPa}$
(2) Butane : $0.1 \text{ MPa} \geq p \geq 0.07 \text{ MPa}$
(3) Isobutane : $0.15 \text{ MPa} \geq p \geq 0.08 \text{ MPa}$
(4) Propane : $0.5 \text{ MPa} \geq p \geq 0.2 \text{ MPa}$
(5) Propylene : $0.6 \text{ MPa} \geq p \geq 0.3 \text{ MPa}$
(6) R22 : $0.5 \text{ MPa} \geq p \geq 0.2 \text{ MPa}$ The cold storage system according to the present invention can be used for the lakes, lagoons and ponds in the districts where the outside air temperature in winter season becomes −5° to −20° C. and also for artificial water tanks. As an artificial water tank, a pool can be utilized, provided that the water tank has a water depth to some extent, for example 1 m or more, desirably, 3 m or more.

In the above-described embodiments, especially as shown in FIGS. 1 and 3, the heat pipe 4 is installed so as to be substantially vertical to the water surface of the lake. However, the present invention is not limited to this embodiment. Even when the heat pipe 4 is oblique to the water surface, the same function and effect as described above can be obtained.

Further, the heat pipe 4 need not be inserted into the bottom of a lake or the like if it is firmly fixed by the upper support unit 14 and the like. Thus, it is possible to keep the bottom portion of the lake water ice-free, thereby protecting ecological system of the lake.

The present invention can be applied not only in the district where the outside temperature in winter is −5° to −20° C., but also in any district where the outside temperature is lower than 0° C. in winter.

Also, where a cold storage system of the present invention is installed in a lake, lagoon or pond, care should be taken not to disrupt its ecological system.

It will be apparent to those skilled in the art that the present invention is not limited to the embodiments and modifications described above, and that various modifications may be made.

What is claimed is:

1. A cold storage system installed in water storage means on the ground whose atmospheric temperature becomes 0° C. or less in winter, comprising:
    at least one heat exchange means having one end located in the water stored in said water storage means and the other end located in the atmosphere and for performing one-direction heat transfer in such a manner as to absorb heat from the water of said water storage means and emit it into said atmosphere;
    hold means for holding the heat exchange means in said water storage means; and
    trap means located in the water of said water storage means for trapping ice produced by said heat exchange means.

2. The cold storage system according to claim 1, wherein said heat exchange means includes a heat pipe in which a heat exchange medium is charged.

3. The cold storage system according to claim 2, wherein said heat exchange medium includes ammonia pressurized in a range of 0.2 to 0.5 MPa.

4. The cold storage system according to claim 1, wherein said trap means has mesh.

5. The cold storage system according to claim 2, wherein said heat pipe has disk-like fins located perpendicularly to its longitudinal axis.

6. The cold storage system according to claim 2, wherein said heat pipe has thin drum-like auxiliary heat pipes located perpendicularly to its longitudinal axis.

7. The cold storage system according to claim 2, further comprising heat insulating means mounted on the upper part except the top portion of said heat pipe and for preventing the water near the surface from freezing and freezing only the water near the bottom of said water storage means.

8. The cold storage system according to claim 2, further comprising a heat exchanger having air supply pipe lines installed in said water storage means and for supplying cold air from the air supply pipe lines to outside.

9. A method of storing cold by utilizing the water in an inland body of standing water such as a lake, lagoon or pond whose atmospheric temperature becomes 0° C. or less in winter, comprising the steps of:
    locating one end of a heat pipe in said body of standing water and holding it in said standing water by hold means;
    locating the other end of said heat exchange means in the atmosphere;
    mounting heat insulating means on at least a portion of said heat pipe except the top portion thereof so as to keep at least a portion of said body of standing water ice-free, thereby protecting an ecological system of said standing water; and performing one-direction heat transfer in such a manner as to absorb heat from said standing water and emit it into said atmosphere.

10. A cold storage system installed in water storage means on the ground whose atmospheric temperature becomes 0° C. or less in winter, comprising:

at least one heat exchange means having one end located in the water stored in said water storage means and the other end located in the atmosphere and for performing one-direction heat transfer in such a manner as to absorb heat from the water of said water storage means and emit it into said atmosphere, said heat exchange means including a heat pipe in which a heat exchange medium is charged, the heat pipe having thin drum-like auxiliary heat pipes located perpendicularly to its longitudinal axis; and hold means for holding the heat exchange means in said water storage means.

11. The cold storage system according to claim 10, wherein said heat exchange medium includes ammonia pressurized in a range 0.2 to 0.5 MPa.

12. The cold storage system according to claim 10, wherein said heat pipe has disk-like fins located perpendicularly to its longitudinal axis.

13. The cold storage system according to claim 10, further comprising a heat exchanger having air supply pipe lines installed in said water storage means and for supplying cold air from the air supply pipe lines to the outside.

14. A cold storage system installed in an inland body of standing water such as a lake, lagoon or pond whose atmospheric temperature becomes 0° C. or less in winter, comprising:

at least one heat exchange means having one end located in the body of standing water and the other end located in the atmosphere and for performing one-direction heat transfer in such a manner as to absorb heat from said standing water and emit it into said atmosphere, said heat exchange means including a heat pipe in which a heat exchange medium is charged;

hold means for holding the heat pipe in said body of standing water; and heat insulating means mounted on at least a portion of said heat pipe except the top portion thereof and for keeping at least a portion of said body of standing water ice-free, thereby protecting an ecological system of said standing water.

15. The cold storage system according to claim 14, wherein said heat exchange medium includes ammonia pressurized in a range 0.2 to 0.5 MPa.

16. The cold storage system according to claim 14, wherein said heat pipe has disk-like fins located perpendicularly to its longitudinal axis.

17. The cold storage system according to claim 14, further comprising a heat exchanger having air supply pipe lines installed in said body of standing water and for supplying cold air from the air supply pipe lines to the outside.

* * * * *